Sept. 20, 1927.
H. B. HOLT
1,642,732
INSTRUMENT FOR APPLYING TIRE CHAINS
Filed Feb. 4, 1927
FIG. I.
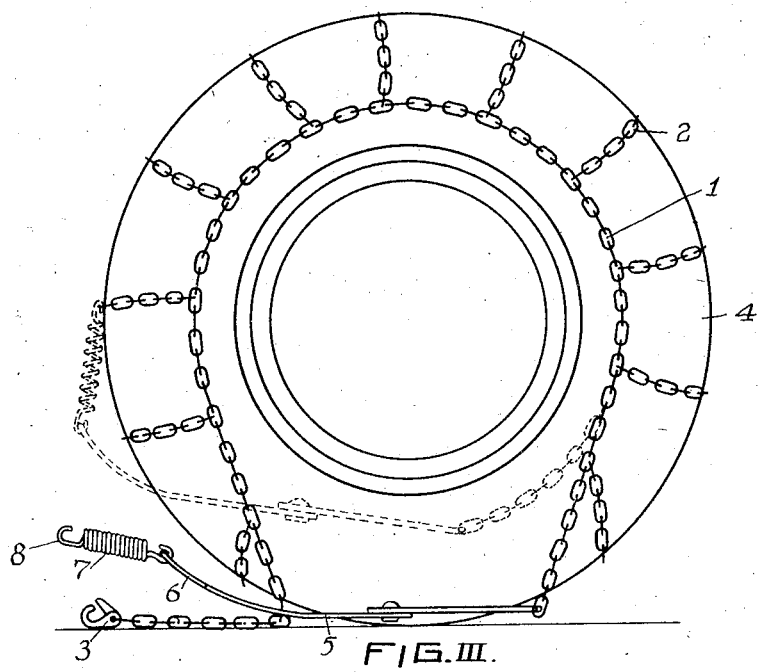
FIG. III.
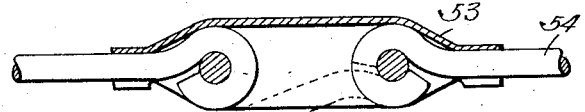
FIG. II.
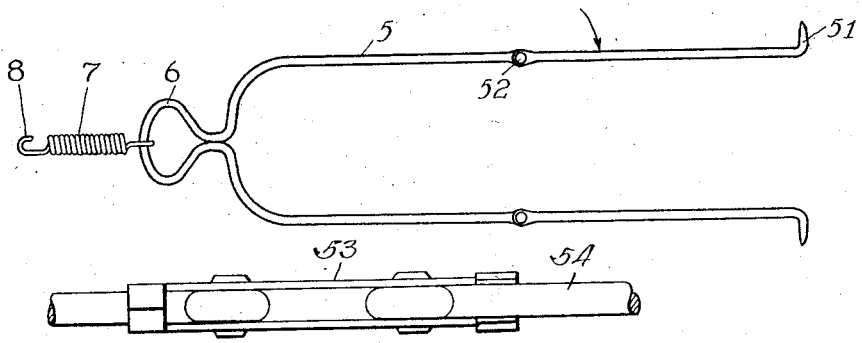
FIG. IV.
INVENTOR
Harris B Holt
by Christy and Christy
his attorneys Patented Sept. 20, 1927.

1,642,732

UNITED STATES PATENT OFFICE.

HARRIS B. HOLT, OF DORMONT, PENNSYLVANIA.

INSTRUMENT FOR APPLYING TIRE CHAINS.

Application filed February 4, 1927. Serial No. 165,840.

My invention is found in an instrument to aid in applying chains to the tires of vehicle wheels.

The instrument and its mode of use are illustrated in the accompanying drawings. Fig. I is a view in side elevation of an automobile wheel with pneumatic tire, and illustrating the use of the instrument of my invention in applying to the tire chains of familiar construction. Fig. II is a view in plan of the instrument alone. Figs. III and IV are views to still larger scale, showing in horizontal section and in side elevation a joint which in Figs. I and II is diagrammatically indicated.

Tire chains removably applied to the tread surfaces of pneumatic tires are compound structures, made up each of two lengths of chain somewhat less in length than the maximum circumference of the tire, and of shorter lengths of chain bridging the two lengths first mentioned, as the rungs of a ladder bridge the interval between the sidepieces. When the chain structure is applied, the two lengths of chain first mentioned lie against the opposite sides of the tire and the shorter lengths of chain extend transversely across the tread of the tire, at intervals around the circumference. The two lengths of chain which extend around the sides of the tire are provided at opposite points in their extent each with a fastening device, and by the release of this device the structure when applied may be removed; by the securing of it the structure when applied again may be made fast for service. In Fig. I the length of chain which extends around one side of the tire is indicated at 1, the cross chains at 2, and the fastening device at 3. In this figure the chain is shown in course of being applied to the tire 4 of the wheel.

The instrument of the invention facilitates application of the chain structure to the tire of a wheel of a vehicle in service. It will be understood that the vehicle may be standing on a road surface of any sort,— hard or soft, muddy, sandy, or snow-covered. The instrument consists of a fork formed of metal rod or heavy wire, whose essential shape is best seen in Fig. II. It is of such size as is indicated in Fig. I. The two branches or tines 5 of the fork are spaced apart sufficiently to allow the instrument to be thrust from left to right (Fig. I) with the branches 5 extending with small but sufficient clearance on either side of the tire. The branches are of such length that when the fork is so thrust upon a tire and in a position near to the ground, the free ends of the fork will extend in proximity to the depending ends of the chains 1, when the chain structure has been spread in usual manner upon the upper surface of the tire. The tips of the branches of the fork are turned to form hooks 51, and by these hooked tips the fork may engage the end links of the chains 1. As a matter of convenience the branches 5 of the instrument may be jointed, so that they may be folded, and pivot joints 52 are shown. These may be so formed that the swinging movement in the direction of the arrow may be positively stopped when the jointed parts are fully extended.

In Figs. III and IV one of the parts is shown to be equipped with a casing 53, in which casing the other part 54 is immediately pivoted. It will be manifest that the part 54 may be swung between the dotted line position and the full line position (Fig. III), and that abutment upon the casing will afford a positive stop, preventing the part 54 from swinging beyond its full line and extended position.

The forked instrument includes a handle 6, conveniently loop-like, and this handle is provided with means for removable attachment to one of the cross chains 2 of the chain structure when the chain structure is spread upon the tire. Such position of the instrument is shown in dotted lines in Fig. I. The means of attachment here shown include a helical spring 7 equipped with a terminal hook 8. It will be observed that while the ends of the branches of the forks engage the chain elements 1 to one side, the right-hand side of the tire, the handle of the fork is attached to a cross chain 2 on the opposite, left-hand side of the tire. The handle 6 of the fork is turned aside from the plane in which the branches of the fork extend. This is for convenience in application. The proportions are such that when the instrument is applied in the manner indicated the crotch of the fork bears upon the tread of the tire, the bearing point becomes a fulcrum point, and the tension of the expanded spring 7 tends to swing the engaged ends of the chains 1 downward and rearward—that is, to the left, as seen in Fig. I.

In use the chain structure is first spread in the usual manner over the upper surface of the tire; its ends depending on opposite sides. The instrument is then advanced from one side (the left) and near the ground, its fork straddling the body of the tire. Care is taken that the depending left-hand end (Fig. I) of the chain structure shall be straddled by and disposed between the branches of the instrument. The stiffness of the instrument and the fact that it straddles the tire with a certain looseness of play, makes the matter a simple one to cause the hooked ends 51 of the fork to engage the links at or near the ends of the chain members 1. Such engagement is shown in Fig. I in full lines to the right. The instrument then is drawn to the left, its handle raised, and the hook 8 is applied to a conveniently located cross-chain 2. As this position—the dotted-line position, Fig. I—is approached the crotch of the instrument bears upon the tread of the tire, the instrument then swings pivotally upon the point of such engagement, and the spring 7 is by the user extended somewhat, before he hooks it to place. The ends of the chains 1 which are engaged by the ends 51 of the fork may then be in accessible position; but, if not, the vehicle may be advanced a little, to bring them to accessible position. When these ends are so made accessible the opposite ends (to the left) of the chains 1 are by the fastening devices 3 secured to the fork-engaged ends. The instrument may then be removed; first by releasing hook 8, and then by releasing the hooks 51.

The development of the automobile industry has evolved a vehicle wheel whose inner side is not easily accessible. The depending inner end of the chain structure when initially spread upon the tire can be got hold of only by reaching in around the wheel. Fenders, body springs, low running boards,—some or all of these may still further interfere with accessibility. Wheels formed of steel disks, brake drums of large diameter, balloon tires, are circumstances which may render the application of tire chains still more difficult. The instrument which I have invented and described, being in its service at all times and in its entirety external to the wheel, requiring no thrusting between spokes, is peculiarly suited to such conditions as those indicated, and is readily serviceable where otherwise the application of chains is a bothersome and difficult matter.

I claim as my invention:

1. An instrument for securing a chain structure to a tire consisting of a fork adapted at its branched ends to engage the side chains of the chain structure, and at its opposite end equipped with means for engaging a cross chain of the chain structure.

2. The instrument of claim 1, the last-named means consisting of a spring with hooked end.

3. An instrument for securing a chain structure to a tire consisting of a fork with oppositely extending prongs and handle, adapted to bear at the crotch pivotally upon the tread of a tire, the forks at the ends of its prongs being adapted to engage the side chains of the chain structure and the handle at its end being adapted to engage a cross-chain of the chain structure.

In testimony whereof I have hereunto set my hand.

HARRIS B. HOLT.